United States Patent
Zhang et al.

(10) Patent No.: US 9,480,106 B2
(45) Date of Patent: Oct. 25, 2016

(54) INTER-BASE STATION LOGICAL INTERFACE COMMUNICATION USING RELAY DEVICES

(71) Applicant: T-Mobile USA, Inc., Bellevue, WA (US)

(72) Inventors: Hongliang Zhang, Samammish, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

(21) Appl. No.: 13/688,146

(22) Filed: Nov. 28, 2012

(65) Prior Publication Data

US 2014/0146739 A1  May 29, 2014

(51) Int. Cl.
| | | |
|---|---|---|
| H04B 7/14 | (2006.01) |
| H04W 92/20 | (2009.01) |
| H04B 7/15 | (2006.01) |
| H04W 88/04 | (2009.01) |

(52) U.S. Cl.
CPC ............ H04W 92/20 (2013.01); H04B 7/15 (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2008/0107013 A1 | 5/2008 | Boariu et al. | |
| 2008/0181167 A1* | 7/2008 | Sydir et al. | 370/315 |
| 2009/0252088 A1 | 10/2009 | Rao et al. | |
| 2010/0087216 A1* | 4/2010 | Ko et al. | 455/500 |
| 2010/0103845 A1* | 4/2010 | Ulupinar et al. | 370/254 |
| 2011/0199919 A1 | 8/2011 | Lin et al. | |
| 2011/0310791 A1 | 12/2011 | Prakash et al. | |
| 2012/0100855 A1* | 4/2012 | Zhang et al. | 455/436 |
| 2012/0147810 A1* | 6/2012 | Wang et al. | 370/315 |
| 2012/0170505 A1* | 7/2012 | Xiao et al. | 370/315 |
| 2013/0039185 A1* | 2/2013 | Teyeb et al. | 370/235 |
| 2013/0137441 A1* | 5/2013 | Kruglick | 455/445 |
| 2013/0150021 A1* | 6/2013 | Oh et al. | 455/422.1 |
| 2013/0231797 A1* | 9/2013 | Li et al. | 700/297 |
| 2013/0315284 A1* | 11/2013 | Nammi | 375/219 |

FOREIGN PATENT DOCUMENTS

| | | |
|---|---|---|
| EP | 2472920 | 7/2012 |
| JP | 2011120181 | 6/2011 |

(Continued)

OTHER PUBLICATIONS

PCT Search Report and Written Opinion mailed Mar. 21, 2014 for PCT application No. PCT/US13/71606, 13 pages.

(Continued)

*Primary Examiner* — Kibrom T Hailu
(74) *Attorney, Agent, or Firm* — Lee & Hayes, PLLC

(57) ABSTRACT

A relay device configured to facilitate a wireless communication over a logical interface between a first base station and a second base station is described herein. The logical interface may be an X2 interface for a Long Term Evolution network. The relay device receives the wireless communication from the first base station using one or more wireless transceivers of the relay device. The relay device may identify the second base station based at least in part on information associated with the wireless communication. Then, the relay device may transmit the wireless communication to the second base station through the one or more wireless transceivers.

14 Claims, 5 Drawing Sheets

(56) References Cited

FOREIGN PATENT DOCUMENTS

| WO | WO2011110224 A1 | 9/2011 |
| WO | WO2011142628 | 11/2011 |

OTHER PUBLICATIONS

Extended European Search Report mailed May 4, 2016 for European Patent Application No. 13857968.5, 9 pages.

\* cited by examiner

INTER-BASE STATION LOGICAL INTERFACE COMMUNICATION USING RELAY DEVICES

BACKGROUND

Long Term Evolution (LTE) networks are emerging as a widely adopted standard for carrying high-speed, packet-switched voice and data communications. These LTE networks have their own network architecture which utilizes new nodes, new protocols, and new interfaces. Access networks, each associated with a geographic area which may be divided into many small sections called cells, have traditionally included base stations, such as Node Bs, and radio network controllers (RNCs). In LTE networks, each cell is associated with an eNode B, which includes some of the traditional functionalities of a base station and some traditional functionalities of an RNC. The eNode Bs are each connected to a core telecommunication network through a wired or wireless backhaul and communicate over that backhaul with nodes of the core telecommunication network using an S1 logical interface. To communicate with each other, e.g., for telecommunication device handovers or radio resource coordination, eNode Bs implement an inter-base station communication for X2 logical interface.

Communications associated with the X2 logical interface may be transmitted between eNode Bs in a number of ways. First, the X2 logical interface communications may be transmitted between a pair of eNode Bs by means of the wired or wireless backhaul to the core telecommunication network and through a router or switch of the core telecommunication network. Alternatively, the eNode Bs may utilize microwave transceivers, WiFi modems, WiMax modems, or their radio resources to engage in wireless communication with each other. The difficulties with this over-the-air solution include spectrum availability, interference mitigation, throughput limitations, cost, location/propagation environments, and link span/coverage limitations. For example, eNode Bs of adjacent cells may be outside of each other's wireless ranges and thus unable to engage in wireless communication.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
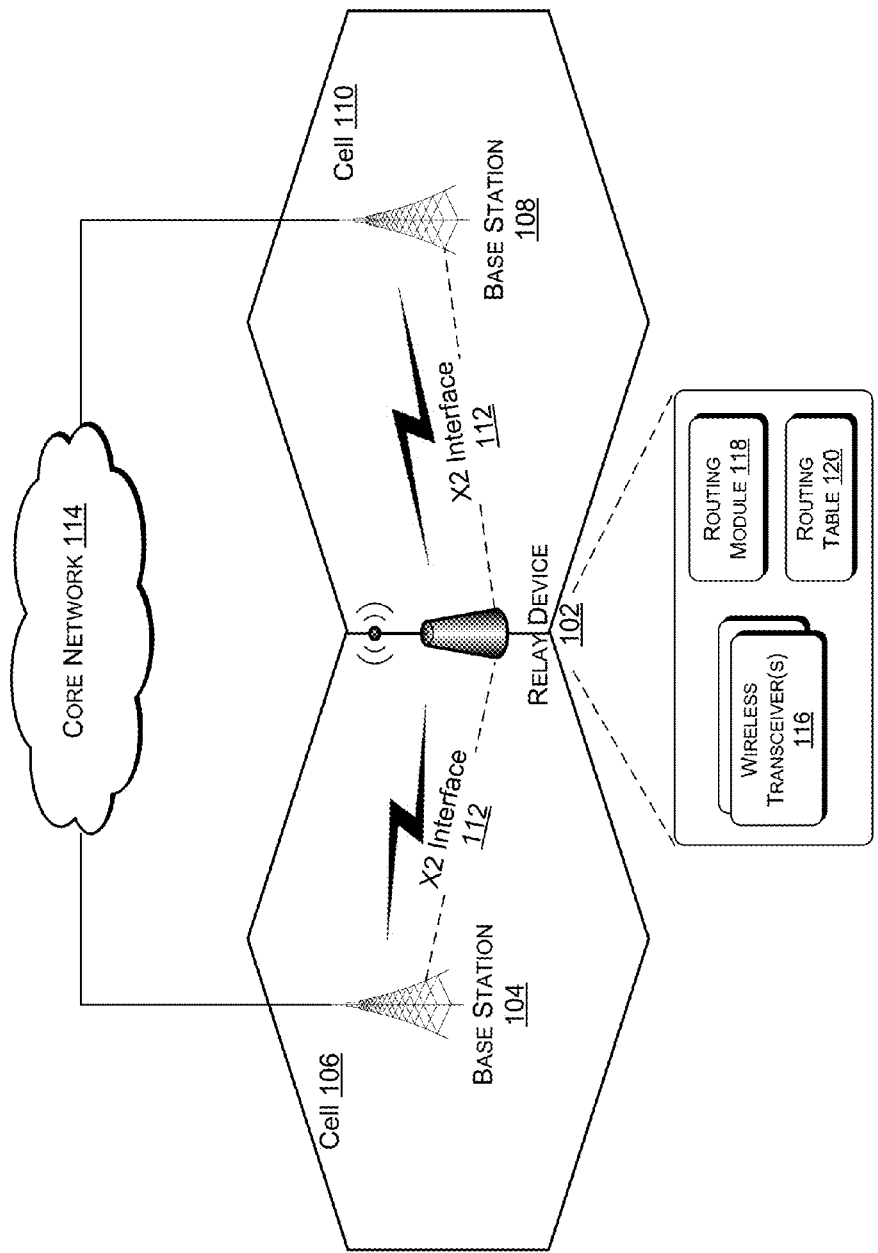
FIG. 1 illustrates an example network architecture with a relay device wirelessly communicating data for a logical interface between two base stations with adjacent cells. One example of the logical interface may be an X2 interface between base stations.

This disclosure describes, in part, techniques for utilizing relay devices capable of wirelessly communicating with base stations to transmit communications associated with a logical interface between or among those base stations. The logical interface may be an X2 logical interface and the base stations may be eNode Bs of an LTE network. The base stations may be associated with adjacent cells of the telecommunication network but may be outside of each other's wireless ranges. However, each may be within range of a relay device, and the base stations may thus utilize the relay device for wireless inter-base station communications, including communications associated with a logical interface between or among the base stations. The logical interface may be used for handovers of telecommunication devices between or among the base stations and radio resource coordination between or among the base stations.

In various embodiments, the relay device may be a mobile hotspot device, a data stick, a signal booster, or a telecommunication device with a fixed or infrequently changing location. The relay device may include one or more wireless transceivers capable of wireless, radio frequency (RF) communication with base stations using the radio resources of the base stations (e.g., a specific signal range). In some embodiments, the relay device may be equipped with a wireless transceiver for each base station capable of wireless communication with the relay device. Using the wireless transceiver(s), the relay device may receive communications from a first base station and may transmit those communications to a second base station or to multiple second base stations. The communications may be associated with the logical interface between/among the first base station and the second base station(s).

In some embodiments, no single relay device may be capable of wireless communication with base stations of adjacent cells; a chain or tree of such relay devices, may, however, be capable of such wireless communication. When a chain or tree of relay devices is utilized for logical interface communications between a pair of base stations, a first relay device may receive the logical interface communications from a source base station and may wirelessly transmit the logical interface communications to another relay device. That relay device or a further relay device of the chain or tree of relay devices may then transmit the logical interface communications to a target base station or target base stations. The wireless communications between the relay devices may be any one or more of WiFi, WiMax, Bluetooth, or Near Field Communication (NFC) wireless communications.

A relay device may be capable of wireless communication with more than two base stations. To enable transmission of received communications when this is the case, the relay device may be configured with a routing table that identifies base stations and other relay devices which are capable of wireless communication with the relay device. Upon receiving a communication from a source base station, the relay device may examine that communication and consult the routing table to determine the identity of the target base station or target base stations.

The relay device may further be configured to discover the identities of the base stations that it is capable of wireless communication with, as well as other relay devices that it can wirelessly communicate with. The relay device may then determine identities of other base stations capable of communicating with the other relay devices. The relay device then notifies a base station that it is capable of wirelessly communicating with of the identities of the other base stations it is capable of wirelessly communicating with and of the identities of other base stations capable of communicating with other relay devices. This notification may occur automatically or in response to a request from the base station. The relay device may also use the discovered identities to construct a routing table. In some embodiments, the discovery of base station identities may be repeatedly periodically or responsive to events, such as movement of the relay device to a different location.

In various embodiments, a base station may periodically discover identities of other base stations that it is capable of direct wireless communication with, as well as identities of other base stations that it may wirelessly communicate with through one or more relay devices. Additionally, the base station may receive identifications of other base stations of adjacent cells from the telecommunication network. Upon determining that one of these base stations of adjacent cells is a target base station for a handover of a telecommunication device or for radio resource coordination, the base station determines whether wireless communication with that target base station is available, either directly, indirectly through a relay device, or both. If wireless communication is not possible, the base station utilizes its wired or wireless backhaul to the core telecommunication network to transmit logical interface communications to the target base station. If both direct and indirect wireless communications are available, the base station may utilize the direct wireless communication with the target base station, unless the signal strength for such a communication falls below a threshold. In the other cases, the base station uses the available direct or indirect wireless communication to transmit the logical interface communications.

Example Environments

FIG. 1 illustrates an example network architecture with a relay device wirelessly communicating data for a logical interface between two base stations with adjacent cells. As illustrated, a relay device may be located in proximity to a base station 104 of a cell 106 and a base station 108 of a cell 110. The cell 106 and cell 110 may be adjacent cells and the relay device 102 may be capable of wireless communication with each of the base station 104 and the base station 108. The base station 104 and base station 108 may wirelessly communicate data associated with a logical interface 112, such as an X2 logical interface 112, between the base station 104 and base station 108 through the relay device 102. The base station 104 and base station 108 may each also be connected to a core telecommunication network 114 via a wired or wireless backhaul. Also, the relay device 102 may include one or more wireless transceivers 116, such as a wireless transceiver for each of the base station 104 and the base station 108, and may be configured with a routing module 118 and/or a routing table 120. Also, the relay device 102 may be configured to communicate with each of base station 104 and base station 108 in alternative time slots through, for example, time domain multiplexing.

Figure 4:
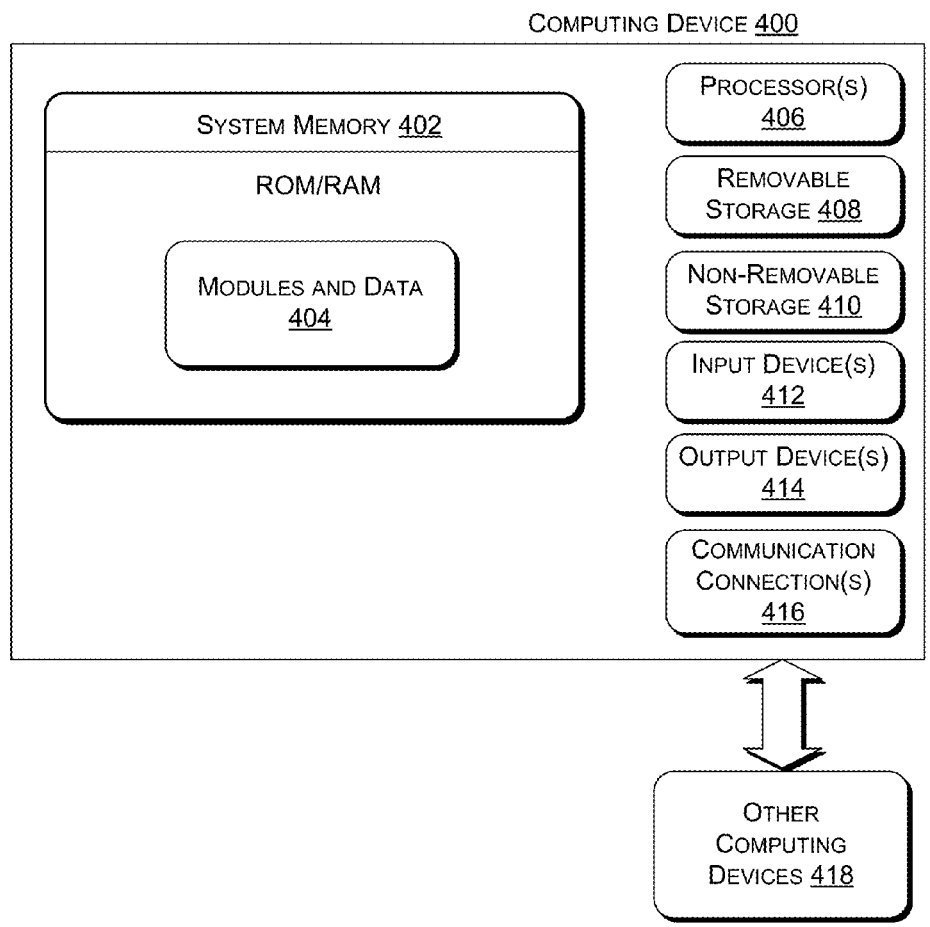
FIG. 4 illustrates an example computing device capable of serving as a base station or a relay device.

In various embodiments, the relay device 102 may be any sort of device that is capable of engaging in wireless, radio frequency (RF) communication, such as a mobile hotspot device, a data stick, a signal booster device, or a telecommunication device. Alternatively, the relay device 102 may be one of a tablet computer, a personal digital assistant (PDA), a personal computer (PC), a laptop computer, a media center, a work station, etc. The relay device 102 may have a relatively fixed location, such as a home or a business, or may be mobile with periods of relative location stability, such as charging periods or times of day when an owner of the relay device 102 is at work or sleeping. If mobile with periods of location stability, the relay device 102 may operate in one of two modes: one in which it may serve as a relay device 102, and another in which it may not. Such a relay device 102 may determine if it is charging or if the time-of-day indicated location stability, and may set its mode accordingly. The relay device 102 may be configured by the telecommunication network (e.g., may be provided with one or both of the routing module 118 or routing table 120). Such configuration may occur prior to the sale of the relay device 102, at the point-of-sale, or at a later time upon connection of the relay device 102 to a base station 104/108. An example relay device 102 is illustrated in FIG. 4 and described below with reference to that figure.

The base stations 104 and 108 may be any sort of base stations, such as base station transceivers, base station controllers, node Bs, or eNode Bs. Alternatively, the base stations 104 and 108 may each be any of a server or server farm, multiple, distributed server farms, a mainframe, a work station, a personal computer (PC), a laptop computer, a tablet computer, an embedded system, or any other sort of device or devices. The base stations 104 and 108 may each have one or more transceiver components that are capable of sending and receiving wireless, RF communications. Such transceivers may utilize any sort of protocol, such as orthogonal frequency-division multiple access (OFDMA) for downlink and single-carrier frequency-division multiple access (SC-FDMA) for uplink. The base stations 104 and 108 may also embed their own control functionality rather than utilizing another access network component, such as a radio network controller (RNC). An example base station 104 or base station 108 is illustrated in FIG. 4 and described below with reference to that figure.

In some embodiments, the cells 106 and 110 may be any sort of cells of a telecommunication network. The cells 106 and 110 may each be associated with a specific geographic area and may be any of a cell, a macrocell, a microcell, a femtocell, etc. As mentioned above, cell 106 and cell 110 may be adjacent cells. As adjacent cells, their base stations 104 and 108 may communicate with each other in a peer-to-peer manner to handover a telecommunication device that is moving from one of the cells 106 and 110 to the other and to coordinate radio resources. Such communication may utilize a logical interface 112, such as an X2 logical interface 112.

Base stations 104 and 108 and their respective cells 106 and 110 may be part of a telecommunication network of a telecommunication service provider. The telecommunication network includes a core telecommunication network, such as core telecommunication network 114, and a plurality of access networks, each associated with a cell and including one or more base stations. Example access networks include LTE networks, Evolved High Speed Packet Access (HSPA+) networks, Universal Mobile Telecommunication System (UMTS) networks, Global System for Mobile Communications (GSM) networks, etc. In some embodiments, the base stations 104 and 108 and their respective cells 106 and 110 may be associated with LTE access networks.

In various embodiments, the core telecommunication network 114 may be an evolved packet core (EPC) network, a general packet radio service (GPRS) core network, or may include elements from both types of core networks. The core telecommunication network 114 may include a mobility management entity (MME), a home subscriber server (HSS), a serving gateway (SGW), and a packet gateway (PGW). Alternatively or additionally, the core telecommunication network 114 may include any or all of a home location register (HLR), a visitor location register (VLR), a serving GPRS support node (SGSN), a gateway GPRS support node (GGSN), a policy control rules function (PCRF) node, a session border controller (SBC), a media gateway, a mobile switching center (MSC), as well as IP multimedia subsystem (IMS) components, such as a presence server, a telephony application server (TAS), and one or more call session control functions (CSCF). The core telecommunication network 114 may provide a variety of services to telecommunication devices connected to access networks through base stations 104 and 108, such as synchronous communication routing across a public switched telephone network (PSTN). Further services may include call control, switching, authentication, billing, etc.

In some embodiments, each of the base stations 104 and 108 is connected to the core telecommunication network 114 through a wired or wireless backhaul. Such a wired or wireless backhaul may include copper wires, co-axial cables, fiber-optic cables, Ethernet, microwave (point-to-point or point-to-multipoint), WiFi, or WiMax. The base stations 104 and 108 may each communicate with a router or switch of the core telecommunication network 114 using the wired or wireless backhaul. The logical interface between the each of the base stations 104 and 108 and the core telecommunication network 114 may be an S1 interface.

As mentioned above, the base stations 104 and 108 may communicate with each other using an X2 logical interface 112, or other logical interface. To facilitate such communications, each of the base stations 104 and 108 maintains a list of other base stations (including the other of base stations 104 and 108) which are capable of direct or indirect wireless communication with that base station 104/108. The base stations 104 and 108 may be configured with the list or may determine this list periodically or in response to an event, such as handover or radio resource coordination. To build the list, each of the base stations 104 and 108 may discover other base stations and relay devices (such as relay device 102) that respond to a wireless broadcast. The base station 104/108 may perform the wireless broadcast using its radio resources (i.e., RF communications). The base station 104/108 then adds other base stations from which it receives a response to the list and requests that responding relay devices provide identifications of base stations that they are capable of wirelessly communicating with, directly or indirectly. Upon obtaining a response, the base station 104/108 then adds those identities to the list. A given base station may appear in the list multiple times with multiple different communication paths to that base station (e.g., direct or indirect, through one or more relay devices). The base station 104/108 may also determine signal strengths associated with each of these communication paths and include that signal strength in the list.

In various embodiments, when the base station 104 determines that it needs to communicate with base station 108 using an X2 logical interface 112, the base station 104 consults the list of base stations to determine whether a wireless communication path to base station 108 is available. If no wireless communication path is available, the base station 104 may transmit an X2 interface communication using the wired or wireless backhaul and a router or switch of the core telecommunication network 114. If the list includes a single communication path, either direct or indirect, the base station 104 utilizes that communication path. If both direct and indirect communication paths are available, the base station 104 selects the direct communication path, unless the signal strength associated with the direct communication path falls below a threshold. The base station 104 then transmits the X2 interface communication using the selected communication path. The base station 104 may also receive X2 interface communications in response as well, such as acknowledgments or other communications effecting an object of the X2 logical interface 112, such as a handover or radio resource coordination.

As illustrated in FIG. 1, the relay device 102 providing wireless communication between the base stations 104 and 108 may include a plurality of wireless transceivers, such as a wireless transceiver for each of base stations 104 and 108. To increase throughput, the wireless transceivers 116 may utilize multiple-input/multiple-output (MIMO) technology. The wireless transceivers 116 may be any sort of wireless transceivers capable of engaging in wireless, RF communication. The wireless transceivers 116 may also include other wireless modems, such as a modem for engaging in WiFi, WiMax, Bluetooth, or NFC communication.

In various embodiments, the routing module 118 of the relay device 102 may answer requests for identifications of reachable base stations, may build a routing table 120, and may receive and transmit X2 interface communications between base stations 104 and 108. Either in response to a request for identification or periodically, the routing module 118 determines the identities of reachable base stations and other relay devices. These identities may be obtained by using the wireless transceivers to transmit a wireless broadcast and to receive responses to that broadcast. The routing module 118 includes the identities of responding base stations in the routing table 120 and in a response to a request from a base station. For example, in response to a request from base station 104, the routing module 118 may respond with a notification of base station identities that includes an identification of base station 108. When the routing module 118 receives broadcast responses from other relay devices, the routing module 118 may query the other relay devices for identifications of the base stations that are reachable from those other relay devices. In some embodiments, the routing module 118 then adds these further base stations to the routing table 118 and includes them in the response to the requesting base station. In some embodiments, if any of the base station identifications received from the other relay devices duplicate base stations which the relay device 102 may communicate with directly, the relay device 102 does not include those duplication base stations in the routing table 120 or response to the base station request.

In further embodiments, the routing module 118 receives communications associated with the X2 logical interface 112 from the base station 104 and transmits those communications to the base station 108. The routing module 118 receives the communications through the wireless transceivers 116. The transmission may occur automatically upon receipt (e.g., when the relay device 102 is only able to communicate with two base stations) or following a determination of the appropriate target base station. To determine the target base station, the routing module 118 may consult the routing table 120 and examine the received communication (e.g., header information of the received communication). Based on the consultation and examination, the routing module 118 determines that the target base station is, e.g., base station 108. Upon determining that the target base station is base station 108, routing module 118 transmits the received communication to base station 108 using the wireless transceivers 116

Figure 2:
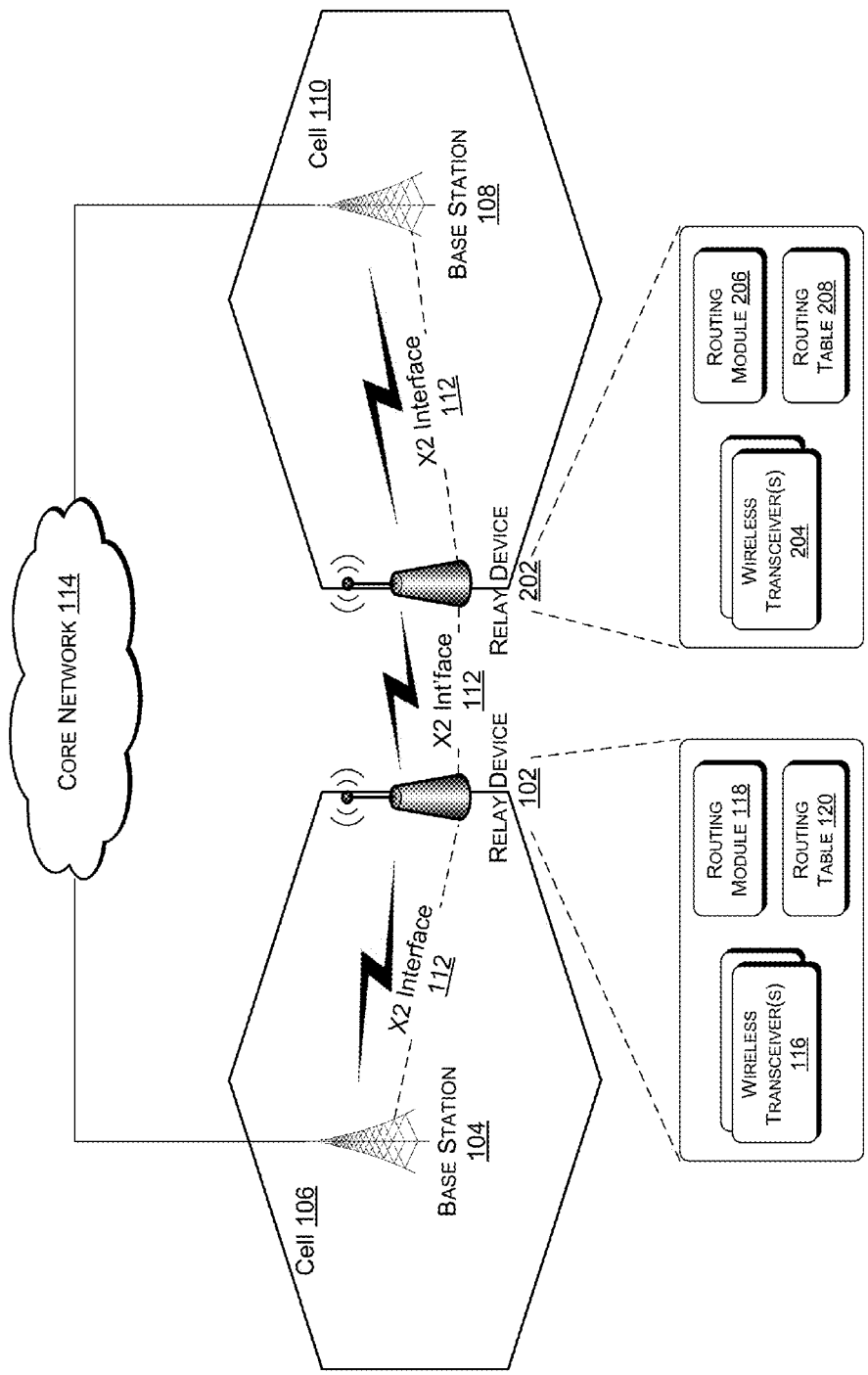
FIG. 2 illustrates an example network architecture with multiple relay devices that wirelessly communicate with each other and which wirelessly communicate data for a logical interface between two base stations with adjacent cells.

FIG. 2 illustrates an example network architecture with multiple relay devices that are wirelessly connected to each other and which wirelessly communicate data for a logical interface between two base stations with adjacent cells. As illustrated in FIG. 2, no single relay device may be capable of wireless communication with multiple base stations. Rather, base station 104 may be capable of wireless communication with relay device 102, and base station 108 may in turn be capable of wireless communication with a relay device 202. The relay devices 102 and 202 may wirelessly communicate with each other using, for example, a WiFi network, a WiMax network, a Bluetooth network, or NFC.

In various embodiments, the relay device 202 may, like relay device 102, be a mobile hotspot, data stick, a signal booster device, or a telecommunication device. Alternatively, the relay device 202 may be one of a tablet computer, a personal digital assistant (PDA), a personal computer (PC), a laptop computer, a media center, a work station, etc. The relay device 202 may have a relatively fixed location, such as a home or a business, or may be mobile with periods of relative location stability, such as charging periods or times of day when an owner of the relay device 202 is at work or sleeping. If mobile with periods of location stability, the relay device 202 may operate in one of two modes: one in which it may serve as a relay device 202, and another in which it may not. Such a relay device 202 may determine if it is charging or if the time-of-day indicated location stability, and may set its mode accordingly. The relay device 202 may be configured by the telecommunication network. Such configuration may occur prior to the sale of the relay device 202, at the point-of-sale, or at a later time upon connection of the relay device 202 to a base station 108. An example relay device 202 is illustrated in FIG. 4 and described below with reference to that figure.

The relay device 202 may also be configured with wireless transceivers 204, a routing module 206, and a routing table 208. These wireless transceivers 204, routing module 206, and routing table 208 may be the same sorts of components as the wireless transceivers 116, the routing module 118, and the routing table 120 and may operate in the same manner as the wireless transceivers 116, the routing module 118, and the routing table 120. In some embodiments, the routing module 118 and routing module 206 may communicate with each other using wireless modems of their respective relay devices 102/202, exchanging identifications of base stations that they are capable of wirelessly communicating with, directly or indirectly. Each may then add the other's identifications to its associated routing table 120/208.

Figure 3:
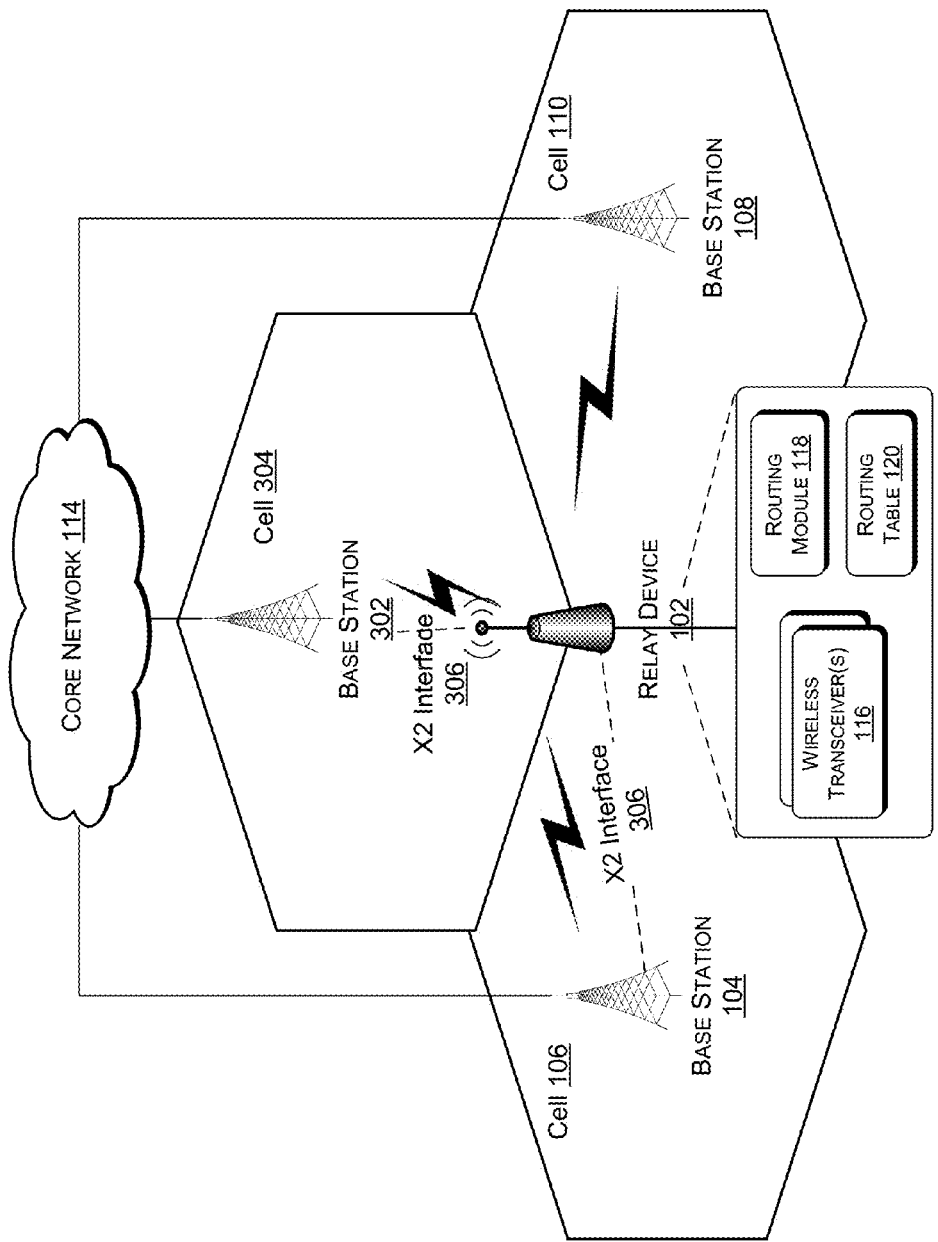
FIG. 3 illustrates an example network architecture with a relay device that is wirelessly connected to three base stations with adjacent cells and which wirelessly communicates data for a logical interface between a pair of those base stations.

FIG. 3 illustrates an example network architecture with a relay device that is wirelessly connected to three base stations with adjacent cells and which wirelessly communicates data for a logical interface between a pair of those base stations. As illustrated in FIG. 3, a third base station 302 of a third cell 304 may be capable of wireless communication with the relay device 102. Also, FIG. 3 shows that rather than engaging in an X2 logical interface 112 with the base station 108, the base station 104 may also or instead engage in a logical interface, such as an X2 logical interface 306, with the base station 302. Because the relay device 102 may receive communications associated with either or both of the X2 logical interface 112 or the X2 logical interface 306, the routing module 118 of the relay device 102 may examine the communications upon receiving them and consult the routing table 120. Based on the examination and consultation, the routing module 118 determines whether the target base station of the communications is the base station 108 or the base station 302 and transmits the communications accordingly.

Example Device

FIG. 4 illustrates an example computing device 400 capable of serving as a base station 104/108/302 or a relay device 102/202. As illustrated, computing device 400 comprises a system memory 402 storing modules and data 404. Also, computing device 400 includes processor(s) 406, a removable storage 408 and non-removable storage 410, input device(s) 412, output device(s) 414 and communication connections 416 for communicating with other computing devices 418.

In various embodiments, system memory 402 is volatile (such as RAM), non-volatile (such as ROM, flash memory, etc.) or some combination of the two. The modules or data 404 stored in the system memory 402 may comprise methods, threads, processes, applications or any other sort of executable instructions, such as the instructions utilized to perform the operations of a base station 104/108/302 or a relay device 102/202. The modules and data 404 may also include files and databases.

In some embodiments, the processor(s) 406 is a central processing unit (CPU), a graphics processing unit (GPU), or both CPU and GPU, or other processing unit or component known in the art.

Computing device 400 also includes additional data storage devices (removable and/or non-removable) such as, for example, magnetic disks, optical disks, or tape. Such additional storage is illustrated in FIG. 4 by removable storage 408 and non-removable storage 410. Tangible computer-readable media may include volatile and nonvolatile, removable and non-removable media implemented in any method or technology for storage of information, such as computer readable instructions, data structures, program modules, or other data. System memory 402, removable storage 408 and non-removable storage 410 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 400. Any such tangible computer-readable media may be part of the computing device 400.

Computing device 400 also has input device(s) 412, such as a keyboard, a mouse, a touch-sensitive display, voice input device, etc., and output device(s) 414 such as a display, speakers, a printer, etc. These devices are well known in the art and need not be discussed at length here.

Computing device 400 also contains communication connections 416 that allow the computing device 400 to communicate with other computing devices 418, such as others of a base station 104/108/302 or a relay device 102/202. In some embodiments, the communication connections 416 are associated with wireless transceivers, such a radio antennas or modems or WiFi modems, or wired connection components, such as Ethernet or WiFi sockets or connectors.

Example Processes

Figure 5:
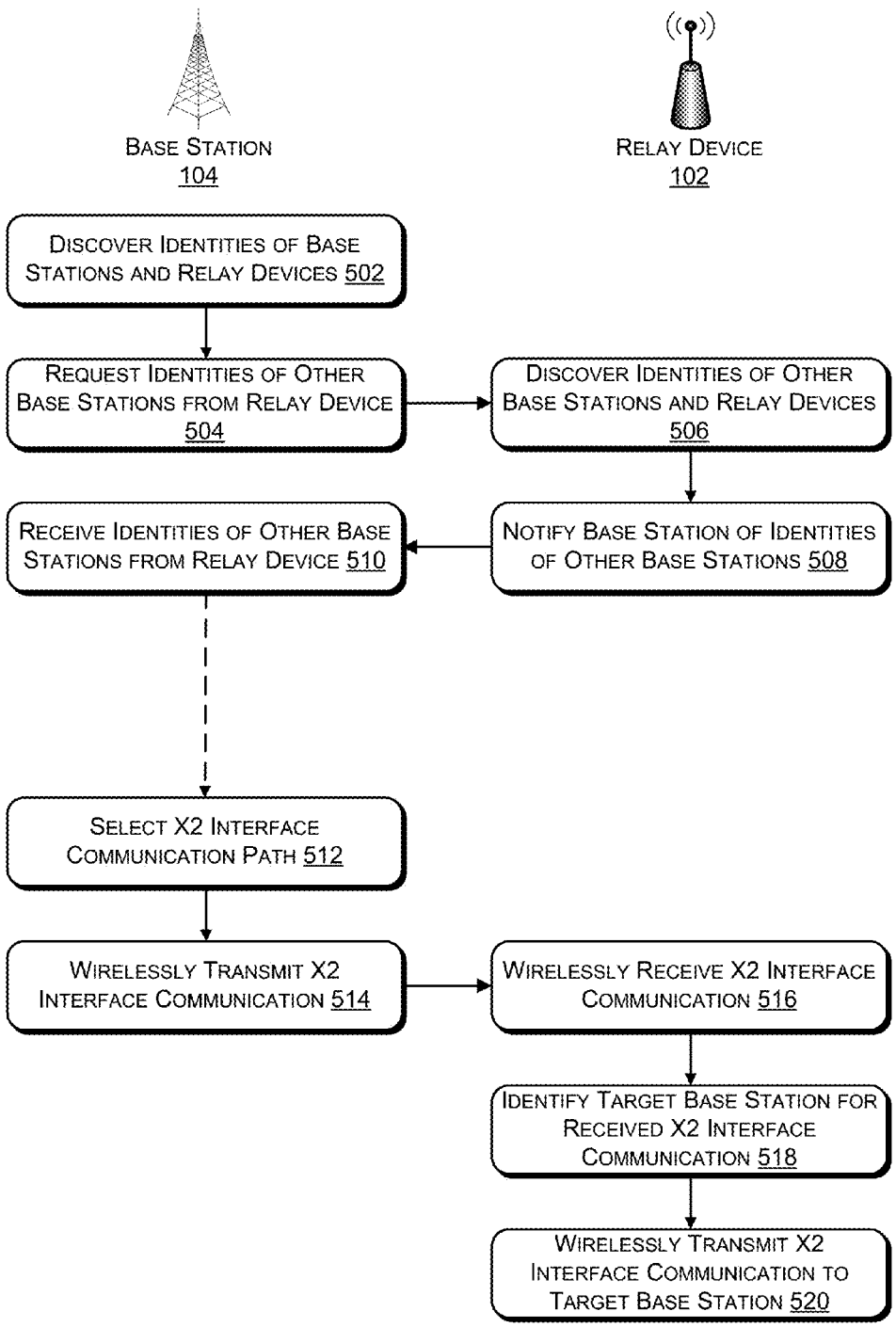
FIG. 5 illustrates an example process for establishing indirect communication paths between base stations though relay devices and for communicating data associated with a logical interface between the base stations through the relay devices.

FIG. 5 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for establishing indirect communication paths between base stations though relay devices and for communicating data associated with a logical interface between the base stations through the relay devices. The process includes, at 502, discovering, by a base station, the identities of other base stations that the base station can wirelessly communicate with and the identities of relay devices capable of wireless communication with the base station. At 504, the base station then requests identities of additional base stations that the relay devices are capable of wireless communication with from the relay devices.

At 506, a relay device receives the request and discovers the identities of the additional base stations that the relay device is capable of wireless communication with. This discovery process may involve consulting or constructing a routing table of the relay device. Also at 506, the relay device may query other relay devices capable of wireless communication with the relay device to discover identities of further base stations that are capable of wireless communication with the other relay devices. At 508, the relay device then notifies the requesting base station of the identities of the other/additional base stations.

At 510, the base station receives the identities of the other/additional base stations.

In some embodiments, the operations shown at 502-510 may occur immediately or some time before the operations shown at 512-520. Multiple iterations of operations 502-510 may in fact be performed before the operations 512-520 are performed. This potential elapse of time is represented in FIG. 5 by the dashed line between the operations shown at 510 and 512.

At 512, the base station selects a logical interface communication path, such as a communication path for transmitting X2 logical interface communications. The base station may perform the selecting in order to establish a logical interface with a target base station for handover of a telecommunication device entering a cell of the target base station or for radio resource coordination with the target base station. If a direct, wireless communication path with the other base station is available, the base station selects that communication path. If the direct, wireless communication path is unavailable or lacks a threshold signal strength, the base station selects an indirect, wireless communication path through one or more relay devices. If no wireless communication path is available, the base station selects the backhaul and core telecommunication network for the communication path. At 514, upon selecting, for example, an indirect, wireless communication path through a relay device, the base station transmits a communication associated with the logical interface to the relay device.

At 516, the relay device wirelessly receives the communication associated with the logical interface. At 518, the relay device determines, based at least on the communication and optionally on a routing table, the identity of the target base station. At 520, the relay device wirelessly transmits the communication to the target base station, either direct or indirectly through another relay device.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a plurality of base stations of adjacent cells of a telecommunication network, the base stations being configured to engage in wireless communications with each other using X2 interface links to perform at least one of assisting telecommunication device handover or coordinating radio resources; and
a relay device configured to engage in direct or indirect wireless communication with the base stations, including wirelessly receiving an X2 interface communication from one of the base stations and wirelessly transmitting the X2 interface communication to another of the base stations, the wirelessly receiving and wirelessly transmitting providing the X2 interface links among the base stations,
wherein a first base station of the plurality of base stations is configured to:
identify a direct communication path and an indirect communication path between the first base station and a second base station,
identify a wireless backhaul communication path between the first base station and the second base station via at least one core network node,
determine that a signal strength for the direct communication path and signal strength of the indirect communication path have both fallen below a predetermined threshold, and
select the wireless backhaul communication path for the wireless transmitting between the first base station and the second base station based at least in part on a signal strength for the direct communication path and the indirect communication path falling below the predetermined threshold.

2. The system of claim 1, wherein each of the base stations is further configured to obtain from each relay device capable of wireless communication with that base station identities of additional base stations that are capable of direct or indirect wireless communication with that relay device.

3. The system of claim 1, wherein each of the base stations is configured to determine that direct wireless communication with another base station and indirect wireless communication with that other base station through a relay device are both available and to utilize the indirect wireless communication when a signal strength associated with the direct wireless communication falls below a threshold.

4. The system of claim 1, wherein each of the base stations engages in wired communication with a core network node of the telecommunication network when no wireless communication with a target base station is available.

5. The system of claim 1, further comprising another relay device, the relay device and other relay device wirelessly communicating with each other, and each of the relay device and the other relay device communicating with at least one of the base stations.

6. The system of claim 5, wherein the relay device and other relay device are configured to wirelessly communicate with each other using a WiFi network, a WiMax network, a Bluetooth network, or NFC.

7. The system of claim 1, wherein the wireless communication of each of the base stations utilizes radio resources of that base station.

8. The system of claim 1, the relay device further comprising a routing table including one or more identities of base stations that are capable of engaging in wireless communication with the relay device and one or more identities of base stations that are indirectly reachable by the relay device through wireless communication with another relay device.

9. A method comprising: identifying, by a first base station, a direct communication path and an indirect communication path between the first base station and a second base station, the indirect communication path including a relay device, and the identifying including receiving, from the relay device, identities of base stations reachable through the relay device; identifying, by the first base station, a wireless backhaul communication path between the first base station and the second base station via at least one core network node; determining, by the first base station, that a signal strength for the direct communication path and signal strength of the indirect communication path have both fallen below a predetermined threshold and selecting, by the first base station, the wireless backhaul communication path for wirelessly transmitting an X2 interface communication between the first base station and the second base station based at least in part on a signal strength for the direct communication path and the indirect communication path falling below the predetermined threshold.

10. The method of claim 9, further comprising:
wirelessly receiving, by the relay device, a further X2 interface communication, the further X2 interface communication being received from a first base station by one or more wireless transceivers of the relay device;
identifying, by the relay device, a second base station based at least in part on information associated with the X2 interface communication; and
wirelessly transmitting, by the relay device, the X2 interface communication to the second base station through the one or more wireless transceivers.

11. The method of claim 9, wherein the first and second base stations are associated with an LTE network.

12. The method of claim 9, wherein the X2 interface communication is associated with a handover of a telecommunication device from the first base station to the second base station.

13. The method of claim 9, wherein the X2 interface communication is associated with radio resource coordination between the first base station and the second base station.

14. The method of claim 10, further comprising discovering other relay devices capable of wired or wireless communication with the relay device, obtaining identities of other base stations capable of wireless communication with the other relay device, and notifying the base stations capable of wireless communication with the relay device of the identities of the other base stations.

* * * * *